United States Patent
Huang et al.

(10) Patent No.: US 12,188,579 B2
(45) Date of Patent: Jan. 7, 2025

(54) GAS APPLIANCE AND A CONTROL METHOD THEREOF

(71) Applicant: GRAND MATE CO., LTD., Taichung (TW)

(72) Inventors: Chung-Chin Huang, Taichung (TW); Chin-Ying Huang, Taichung (TW); Hsin-Ming Huang, Taichung (TW); Hsing-Hsiung Huang, Taichung (TW); Yen-Jen Yeh, Taichung (TW)

(73) Assignee: GRAND MATE CO., LTD., Taichung (TW)

( * ) Notice: Subject to any disclaimer, the term of this patent is extended or adjusted under 35 U.S.C. 154(b) by 618 days.

(21) Appl. No.: 17/411,963

(22) Filed: Aug. 25, 2021

(65) Prior Publication Data

US 2023/0062854 A1    Mar. 2, 2023

(51) Int. Cl.
*F16K 5/10*    (2006.01)
*F23N 5/02*    (2006.01)
*F23N 5/10*    (2006.01)

(52) U.S. Cl.
CPC ............ *F16K 5/103* (2013.01); *F23N 5/022* (2013.01); *F23N 5/10* (2013.01); *F23N 2225/19* (2020.01);
(Continued)

(58) Field of Classification Search
CPC .......... C09K 3/1436; C08J 5/24; F23G 7/068; F28D 20/00; F23C 15/00; F23C 2202/00
(Continued)

(56) References Cited

U.S. PATENT DOCUMENTS 3,589,184 A * 6/1971 Moore .................. G01N 25/42
                                                    374/36
8,904,971 B2    12/2014 Huang et al.
(Continued)

FOREIGN PATENT DOCUMENTS

CN    104422134 A    3/2015
CN    112747476 A    5/2021
(Continued)

OTHER PUBLICATIONS

Search report for TW110124809, Issued on Mar. 9, 2022, Total of 1 page.
(Continued)

*Primary Examiner* — Steven B McAllister
*Assistant Examiner* — John E Bargero
(74) *Attorney, Agent, or Firm* — Apex Juris, pllc; R. Lynette Wylie

(57) ABSTRACT

A gas appliance comprises a combustion device, an ignitor, a gas valve, a blower, a detecting device, and a control device. A control method thereof comprises: the control device is operated in a detection mode in which the control device controls the ignitor to ignite and controls the gas valve as well as the blower to provide a fixed gas flow and a fixed air flow to the combustion device. After igniting the flames, the control device determines burning states detected by the detecting device; if matching a first state, the control device controls the gas valve and the blower in correspondence to a first control data of the first natural gas; if matching the second state, the control device controls the gas valve and the blower in correspondence to a second control data of the second natural gas. In this way, the gas appliance is suitable for burning natural gas generating various heating values.

16 Claims, 8 Drawing Sheets

(52) U.S. Cl.
CPC ...... *F23N 2227/20* (2020.01); *F23N 2235/06* (2020.01); *F23N 2235/16* (2020.01); *F23N 2235/18* (2020.01); *F23N 2235/24* (2020.01)

(58) Field of Classification Search
USPC .......................................................... 431/12
See application file for complete search history.

(56) References Cited

U.S. PATENT DOCUMENTS

| | | | | |
|---|---|---|---|---|
| 9,022,064 | B2* | 5/2015 | Deng | F23C 1/00 |
| | | | | 137/489.5 |
| 2005/0250061 | A1* | 11/2005 | Lochschmied | F23N 1/022 |
| | | | | 431/75 |
| 2007/0154856 | A1* | 7/2007 | Hallit | F23K 5/005 |
| | | | | 431/62 |
| 2010/0190117 | A1* | 7/2010 | Kemp | F23N 1/002 |
| | | | | 73/23.31 |
| 2014/0212824 | A1* | 7/2014 | Huang | F23N 5/242 |
| | | | | 431/2 |

FOREIGN PATENT DOCUMENTS

| | | |
|---|---|---|
| EP | 1522790 A2 | 4/2005 |
| JP | 2020029994 A | 2/2020 |
| JP | 2020186866 A | 11/2020 |
| TW | 202122723 A | 6/2021 |
| TW | M618682 U | 10/2021 |
| WO | 2019170309 A1 | 9/2019 |

OTHER PUBLICATIONS

English abstract for CN104422134, Total of 1 page.
English abstract for TW202122723, Total of 1 page.
English abstract for CN112747476, Total of 1 page.
English abstract for JP2020186866, Total of 1 page.
English abstract for JP2020029994, Total of 1 page.
English abstract for TWM618682, Total of 1 page.
Search Report for EP22177178.5, Issued on Nov. 29, 2022, Total of 6 pages.
Translation of Abstract of EP1522790, Total of 1 page.
Translation of Abstract of WO2019170309, Total of 1 page.

* cited by examiner

GAS APPLIANCE AND A CONTROL METHOD THEREOF

BACKGROUND OF THE INVENTION

Technical Field

The present invention generally relates to a gas appliance, and more particularly to a gas appliance for natural gas with various heating values and a control method thereof.

Description of Related Art

Natural gas used in gas appliances is transmitted from gas suppliers to users through transmission pipelines. The heating values of natural gas vary depending on where it is extracted. To avoid the difference in heating values affecting combustion efficiency and safety of users' gas appliances, gas suppliers usually supply natural gas with the same heating value to users who are on the same transmission pipeline.

When the heating value of natural gas purchased by the gas suppliers varies, for example, natural gas with higher heating value is purchased instead of the original lower heating value one, once the higher heating value one is directly injected into the transmission pipeline, incomplete gas combustion will occur at the gas appliance of the user, resulting in too much carbon monoxide.

On the contrary, if the natural gas with a lower heating value is directly injected into the transmission pipeline instead of the original higher heating value one, it will cause poor combustion efficiency of the gas appliance of the user.

BRIEF SUMMARY OF THE INVENTION

In view of the above, the object of the present invention is to provide a gas appliance for natural gas with various heating values and a control method thereof.

The present invention provides a gas appliance for connecting a gas supply pipe. The gas supply pipe is for injecting natural gas which is one of a first natural gas and a second natural gas. A heating value of the first natural gas and that of the second natural gas are different. The gas appliance comprises a combustion device, an ignitor, a gas valve, a blower, a detecting device, and a control device. The combustion device is for burning the natural gas to generate flames. The ignitor is disposed beside the combustion device to ignite the natural gas output by the combustion device. The gas valve communicates with the gas supply pipe and the combustion device, and is controlled to change a gas flow supplied to the combustion device. The blower is controlled to change an air flow supplied to the combustion device. The detecting device is for detecting the burning states of the flames of the combustion device. The control device electrically connects the gas valve, the blower, and the detecting device. The control device is operated in a detection mode in which the control device controls the ignitor to ignite and controls the gas valve as well as the blower to provide a fixed gas flow and a fixed air flow to the combustion device. After igniting the flames, the control device determines whether the burning state detected by the detecting device matches a first state or a second state. If matching the first state, the control device is operated in a first operation mode and controls the gas valve and the blower in correspondence to a first control data of the first natural gas so the combustion device is suitable for burning the first natural gas. If matching the second state, the control device is operated in a second operation mode and controls the gas valve and the blower in correspondence to a second control data of the second natural gas so the combustion device is suitable for burning the second natural gas.

The present invention provides a control method of the gas appliance, which is executed by the control device and comprises the following steps:

The control device is operated in a detection mode in which the control device controls the ignitor to ignite and controls the gas valve as well as the blower to provide a fixed gas flow and a fixed air flow to the combustion device.

After igniting the flames, the control device determines whether the burning state detected by the detecting device matches a first state or a second state.

If matching the first state, the control device is operated in a first operation mode and controls the gas valve and the blower in correspondence to a first control data of the first natural gas so the combustion device is suitable for burning the first natural gas.

If matching the second state, the control device is operated in a second operation mode and controls the gas valve and the blower in correspondence to a second control data of the second natural gas so the combustion device is suitable for burning the second natural gas.

The advantage of the present invention is that in correspondence to the burning state, the control device can determine whether the natural gas provided by the gas supply pipe is the first natural gas or the second natural gas, and is operated in a corresponding first operation mode or a second operation mode to be suitable for burning the first natural gas or the second natural gas with different heating values.

BRIEF DESCRIPTION OF THE SEVERAL VIEWS OF THE DRAWINGS

The present invention will be best understood by referring to the following detailed description of some illustrative embodiments in conjunction with the accompanying drawings, in which.

DETAILED DESCRIPTION OF THE INVENTION

The following illustrative embodiments and drawings are provided to illustrate the disclosure of the present invention, these and other advantages and effects can be clearly understood by persons skilled in the art after reading the disclosure of this specification.

Figure 1:
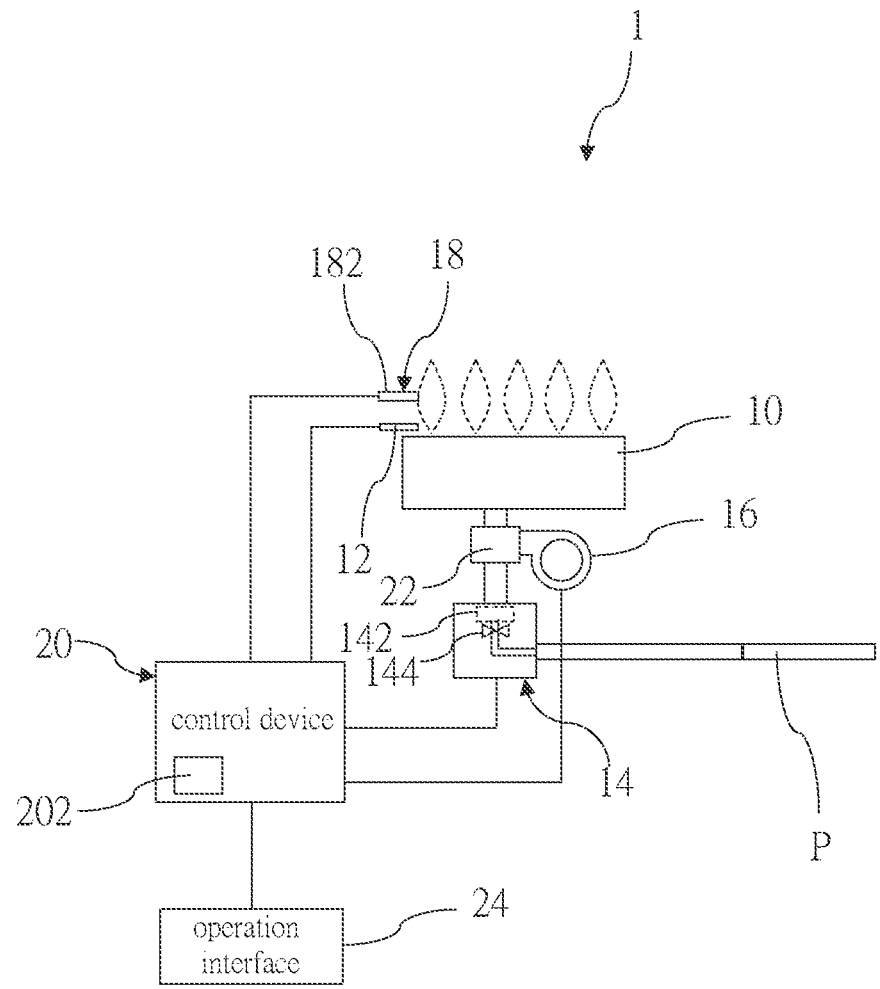
FIG. 1 is a schematic view of a gas appliance of a first embodiment according to the present invention.

As illustrated in FIG. 1, a gas appliance 1 of a first embodiment according to the present invention is for connecting a gas supply pipe P. The gas supply pipe P is for injecting natural gas provided by gas suppliers. The natural gas is one of a first natural gas and a second natural gas, and a heating value of the first natural gas and that of the second natural gas are different. In the current embodiment, the heating value of the first natural gas is less than that of the second natural gas. The heating value of the first natural gas is 8900 Kcal/M3 as an example, and the heating value of the second natural gas is 9700 Kcal/M3 as an example, but it is not limited thereto. The gas appliance 1 comprises a combustion device 10, an ignitor 12, a gas valve 14, a blower 16, a detecting device 18, and a control device 20.

The combustion device 10 is for burning the natural gas to generate flames. The ignitor 12 is disposed beside the combustion device 10 to generate a spark to ignite the natural gas output by the combustion device 10 to form flames.

The gas valve 14 communicates with the gas supply pipe P and the combustion device 10, and is controlled to change a gas flow supplied to the combustion device 10. In the current embodiment, the gas valve 14 is provided with a gas regulating valve 142 to regulate the gas flow supplied to the combustion device 10. The gas valve 14 is further provided with a passage solenoid 144 to open or block the gas flowing to the combustion device 10.

The blower 16 provides combustible air to the combustion device 10. The blower 16 can be controlled to change a rotation speed to change the air flow supplied to the combustion device 10. In the current embodiment, an air outlet of the blower 16 is connected to a mixer 22 disposed between the gas valve 14 and the combustion device 10. Gas output by the gas valve 14 is mixed with air through the mixer 22 and then is supplied to the combustion device 10.

The detecting device 18 is for directly or indirectly detecting burning states of the flames of the combustion device 10. To directly detect the burning states of the flames can be direct contact with the flames, or at a distance from the flames without contacting the flames. To indirectly detect the burning states of the flames can be by detecting the product of gas combustion, or by detecting the characteristics of the substance heated by the flames, to get the burning state of the flames accordingly. In the current embodiment, the detecting device 18 includes a thermocouple 182 for contacting the flames, detecting the flames generated by the combustion device 10, and outputting a corresponding detection voltage which corresponds to the burning state of the flames of the combustion device 10.

The control device 20 electrically connects the gas valve 14, the blower 16, and the detecting device 18. The control device 20 is for controlling the operation of the gas valve 14 and the blower 16 to change the gas flow and the air flow supplied to the combustion device 10, and to receive the burning states detected by the detecting device 18. The control device 20 has a memory 202 storing a first control data and a second control data. The first control data corresponds to the first natural gas and controls the gas valve 14 and the rotation speed of the blower 16 to reach a preferred ratio of the air flow to the first natural gas flow, in which the first control data provides corresponding air flow at different gas flow rates. The second control data corresponds to the second natural and controls the gas valve 14 and the rotation speed of the blower 16 to reach a preferred ratio of the air flow to the second natural gas flow, in which the second control data provides corresponding air flow at different gas flow rates. The memory 202 further stores an initial control data which controls the gas valve 14 to supply a fixed gas flow and controls the blower 16 to run at a fixed speed and provide a fixed air flow. In the current embodiment, the initial control data corresponds to the first natural gas flow to provide a preferred ratio of the air flow to the first natural gas flow, but it is not limited thereto. Under the circumstances, if the gas supplied by the gas supply pipe P is the first natural gas, the combustion device 10 has better combustion efficiency and a burning state of the flames at this time can be predefined as a first state. If the gas supplied by the gas supply pipe P is the second natural gas, the combustion device 10 has poor combustion efficiency and a burning state of the flames at this time can be predefined as a second state. In the current embodiment, when the burning state of the flames is the first state, the combustion efficiency is better and the detection voltage output by the thermocouple 182 is greater than a predetermined voltage. On the contrary, when the detection voltage output by the thermocouple 182 is less than the predetermined voltage, the burning state of the flames is the second state.

In one embodiment, the initial control data corresponds to the ratio of the air flow to the second natural gas flow. If the gas supplied by the gas supply pipe P is the first natural gas, the combustion device 10 has poor combustion efficiency and a burning state of the flames at this time can be predefined as a first state. If the gas supplied by the gas supply pipe P is the second natural gas, the combustion device 10 has better combustion efficiency and a burning state of the flames at this time can be predefined as a second state.

The control device 20 can be operated in a detection mode, a first operation mode, or a second operation mode. Wherein, the detection mode is to determine whether the supplied gas is the first natural gas or the second natural gas. The first operation mode is for controlling the gas valve 14 and the blower 16 in correspondence to the first control data of the first natural gas. The second operation mode is for controlling the gas valve 14 and the blower 16 in correspondence to the second control data of the second natural gas.

In the current embodiment, the control device 20 is further connected to an operation interface 24 in a wired or wireless manner. The operation interface 24 is for a user to operate to output a detection signal or a start signal to the control device 20, in which the detection signal commands the control device 20 to execute the detection mode while the start signal commands the control device 20 to be operated in the first operation mode or the second operation mode which are determined by the detection mode. The operation interface 24 includes at least one switch to output a detection signal and a start signal. For example, long press the switch for a few seconds to form the detection signal and short press the switch to form a start signal. In practice, there can be two switches including a detection switch and a start switch, in which the detection switch is for a user to operate to output the detection signal to the control device 20 while the start switch is for the user to operate to output the start signal to the control device 20. In one embodiment, the source of the detection signal can be provided by an external electronic device via a communication network.

Figure 2:
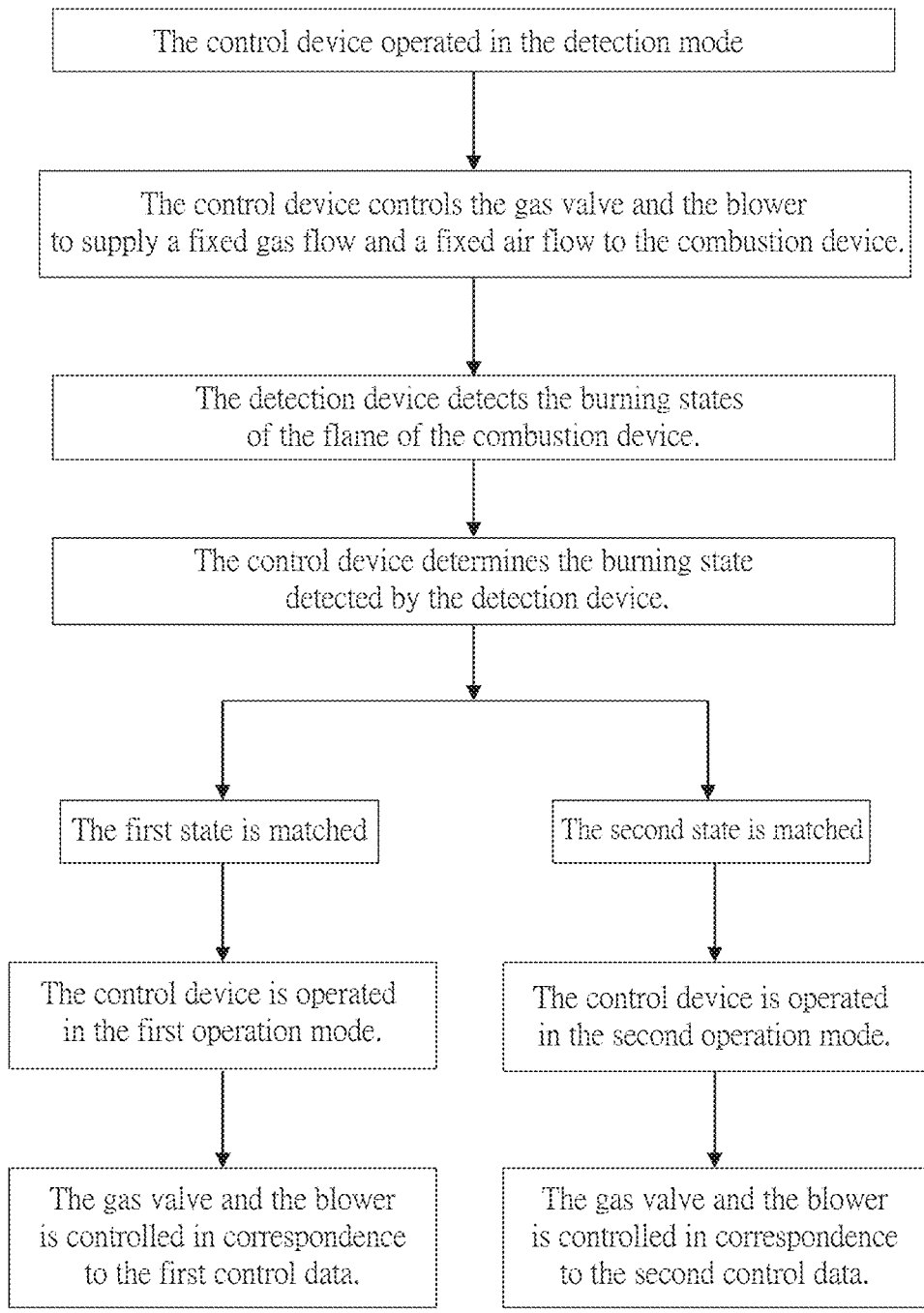
FIG. 2 is a flow chart of a control method of the gas appliance of the first embodiment.

The control device 20 executes a control method illustrated in FIG. 2, the control method comprising the following steps:

When the gas appliance 1 is on standby, the control device 20 is operated in the detection mode when receiving the detection signal. In the detection mode, the control device 20 controls the ignitor 12 to ignite and controls the gas valve 14 and the blower 16 to provide a fixed gas flow and a fixed air flow to the combustion device 10. In the current embodiment, the operation interface 24 is operated by a user to output the detection signal to the control device 20. In the detection mode, the control device 20 activates the ignitor 12 to ignite and controls the gas valve 14 and the blower 16 in correspondence to the initial control data to provide the fixed gas flow and the fixed air flow to the combustion device 10. In this way, the gas can burn steadily and generate a stable burning state which will not change due to changes in the gas flow or the air flow.

After igniting the flames, the detecting device 18 detects the burning states of the flames of the combustion device 10. The control device 20 determines the burning state detected by the detecting device matches the first state or the second state. In the current embodiment, the control device 20 determines whether the detection voltage output by the thermocouple 182 is greater than the predetermined voltage, and then determines whether the first state or the second state is matched.

If the detection voltage is greater than the predetermined voltage, it is determined that the burning state of the flames matches the first state, which represents that the gas supplied by the gas supply pipe P is the first natural gas. The control device 20 is then switched to be operated in the first operation mode, in which the control device 20 controls the gas valve 14 and the blower 16 according to the first control data in correspondence to the first natural gas so that the combustion device 10 is suitable for burning the first natural gas. In other words, the ratio of the air flow to the first natural gas flow is better in the first operation mode so that the combustion device 10 has better combustion efficiency. The first operation mode is configured by the control device 20 to be a preset operation mode, and subsequently the control device 20 runs in the first operation mode. After the control device 20 controls the gas valve 14 to block gas and controls the blower 16 to stop running, the gas appliance is on standby. When receiving the start signal, the control device 20 is operated in the preset operation mode (that is, the first operation mode), in which the control device 20 controls the ignitor 12 to ignite, and controls the gas valve 14 and the blower 16 in correspondence to the first control data.

If detection voltage is less than the predetermined voltage, it is determined that the burning state of the flames matches the second state, which represents that the gas supplied by the gas supply pipe P is the second natural gas. The control device 20 is then switched to be operated in the second operation mode, in which the control device 20 controls the gas valve 14 and the blower 16 according to the second control data in correspondence to the second natural gas so that the combustion device 10 is suitable for burning the second natural gas. In other words, the ratio of the air flow to the second natural gas flow is better in the second operation mode so that the combustion device 10 has better combustion efficiency. The second operation mode is configured by the control device 20 to be a preset operation mode, and subsequently the control device 20 runs in the second operation mode. After the control device 20 controls the gas valve 14 to block gas and controls the blower 16 to stop running, the gas appliance 1 is on standby. When receiving the start signal, the control device 20 is operated in the preset operation mode (that is, the second operation mode), in which the control device 20 controls the ignitor 12 to ignite, and controls the gas valve 14 and the blower 16 in correspondence to the second control data.

In one embodiment, when the control device 20 in the detection mode determines that the burning state detected by the detecting device 18 does not matches the first state and the second state, the control device 20 controls the gas valve 14 to block gas and controls the blower 16 to stop running. For example, if the detection voltage of the thermocouple 182 is greater than the predetermined voltage, it represents the first state; if the detection voltage is less than the predetermined voltage and greater than another one predetermined voltage, it represents the second state; if the detection voltage is less than the another one predetermined voltage, it represents a third state (does not match the first state and the second state.) The third state means poor combustion efficiency, in which the control device 20 controls the gas valve 14 to block gas and controls the blower 16 to stop running to avoid danger.

With the above-mentioned control method, the control device 20 can determine whether the gas supplied by the gas supply pipe P is the first natural gas or the second natural gas in correspondence to the burning state of the flames detected by the detection mode, and the preset operation mode can be configured to be the corresponding first operation mode or the second operation mode. Then, after the gas appliance 1 is on standby or turned off and on again, the control device 20 controls the gas valve 14 and the blower 16 in the preset operation mode to be suitable for burning the first natural gas or the second natural gas.

After that, the user operates the operation interface 24 to output the detection signal to the control device 20, and the control device 20 can be operated in the detection mode again so that the preset operation mode is configured to be the suitable first operation mode or the second operation mode.

To prevent the natural gas supplied by the gas supply pipe P from being changed during the use of the gas appliance 1, in the current embodiment, after the control device 20 is operated in the first operation mode or the second operation mode, it will be operated in the detection mode to determine whether the gas supplied by the gas supply pipe P is the first natural gas or the second natural gas.

After the control device 20 is operated in the first operation mode, the control device 20 will be operated in the detection mode at predetermined intervals, and the predetermined interval may be, for example, 20 to 30 minutes. In the detection mode, the control device 20 controls the gas valve 14 and the blower 16 to provide a fixed gas flow and a fixed air flow to the combustion device 10. The control device 20 determines whether the burning state detected by the detection device 18 matches the first state or the second state. If matching the first state, it represents that the natural gas is still the first natural gas and the control device 20 is operated in the first operation mode. If matching the second state, it represents that the natural gas has turned to be the second natural gas. The control device 20 is then switched to be operated in the second operation mode which is then configured to be the preset operation mode.

After the control device 20 is operated in the second operation mode, the control device 20 will be operated in the detection mode at the predetermined intervals. The control device 20 controls the gas valve 14 and the blower 16 to provide a fixed gas flow and a fixed air flow to the combustion device 10, and determines whether the burning state detected by the detection device 18 matches the first state or the second state. If matching the second state, it represents that the natural gas is still the second natural gas and the control device 20 is operated in the second operation mode. If matching the first state, it represents that the natural gas has turned to be the first natural gas. The control device 20 is switched to be operated in the first operation mode which is then configured to be the preset operation mode.

Figure 3:
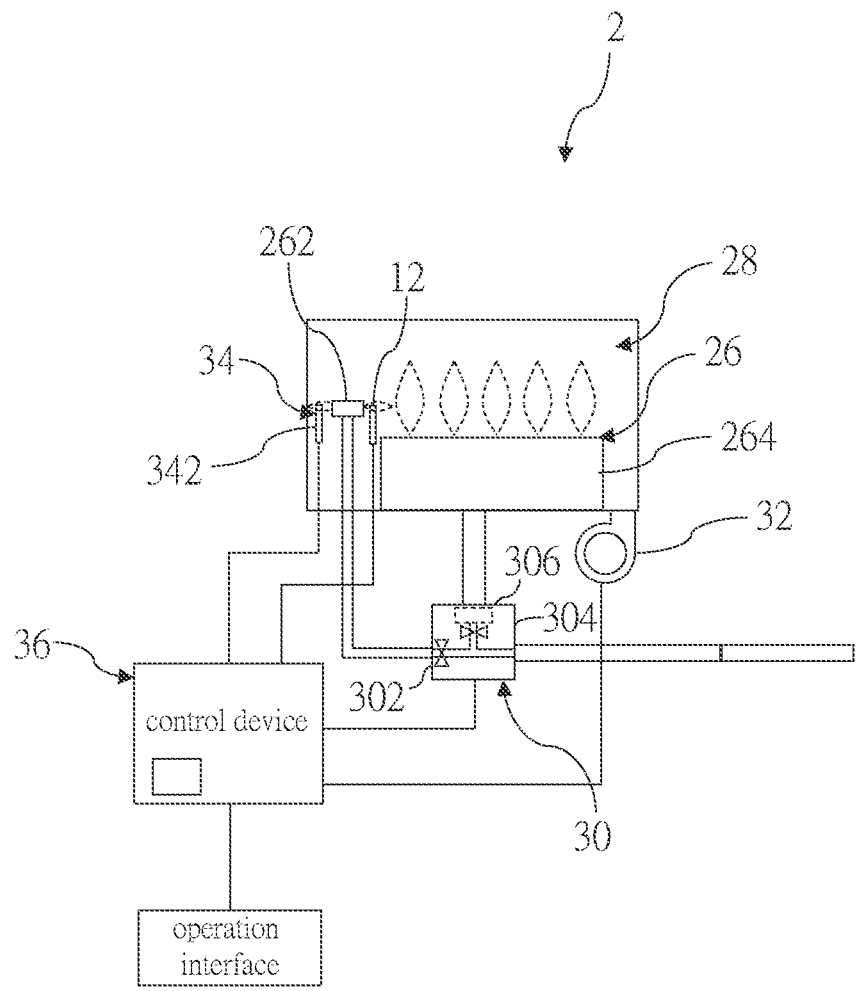
FIG. 3 is a schematic view of a gas appliance of a second embodiment according to the present invention.

A gas appliance 2 of a second preferred embodiment according to the present invention is shown in FIG. 3, wherein the gas appliance 2 includes a structure which is similar to the gas appliance 1 of the first embodiment, except that the combustion device 26 is disposed in a combustion chamber 28 and includes a pilot fire burner 262 and a main fire burner 264.

The gas valve 30 communicating the pilot fire burner 262 and the main fire burner 264 has a pilot fire solenoid valve 302, a main fire solenoid valve 304, and a gas regulating valve 306 inside. The pilot fire solenoid valve 302 and the main fire solenoid valve 304 are respectively to open or block the gas flowing to the pilot fire burner 262 and the main fire burner 264, and the gas regulating valve 306 is to regulate the gas flowing to the main fire burner 264.

An air outlet of a blower 32 is communicated to the combustion chamber 28 to provide combustible air to the combustion chamber 28.

A detecting device 34 includes a flame sensing electrode 342 for detecting an impedance of the flames which is generated by the combustion device 26. In the current embodiment, the flame sensing electrode 342 is disposed at the combustion chamber 28 beside the pilot fire burner 262. The flame sensing electrode 342 electrically connects a control device 36. Since flames are conductive, the higher the combustion efficiency, the more contact area between flames and the flame sensing electrode 342, and the lower impedance detected by the flame sensing electrode 342. Therefore, the impedance of the flames detected by the flame sensing electrode 342 is in correspondence to the burning state of the flames of the combustion device 26.

Accordingly, the control device 36 can be applied to the control method of the first embodiment. The difference is that when the ignitor 12 is controlled to ignite, the control device 36 controls the pilot fire solenoid valve 302 to open to ignite the pilot fire. After the flame sensing electrode 342 detects flames of the pilot fire, the control device 36 controls the main fire solenoid valve 304 to open and controls the gas regulating valve 306 to regulate the gas flowing to the main fire burner 264. As long as the pilot fire solenoid valve 302 is controlled to keep open, the gas flow rate supplied to the pilot fire burner 262 can be fixed. Since the air flow supplied by the blower 32 is provided to the pilot fire burner 262 and the main fire burner 264, the burning states of the flames of the combustion device 26 can be obtained by detecting the flames generated by the pilot fire burner 262. In one embodiment, a flame sensing electrode can also be disposed beside the main fire burner 264 so to detect the burning states of the flames generated by the main fire burner 264.

In the detection mode, the control device 36 determines whether the burning state is the first state or the second state in correspondence to the impedance of the flames detected by the flame sensing electrode 342. When the detected impedance of the flames is less than a predetermined impedance, the control device 36 determines that the first state is matched, which represents that the natural gas is the first natural gas. When the detected impedance of the flames is greater than a predetermined impedance, the control device 36 determines that the second state is matched, which represents that the natural gas is the second natural gas.

In this way, the control device 36 can be switched to be operated in the first operation mode or the second operation mode in correspondence to the flames state detected by the detection mode.

Figure 4:
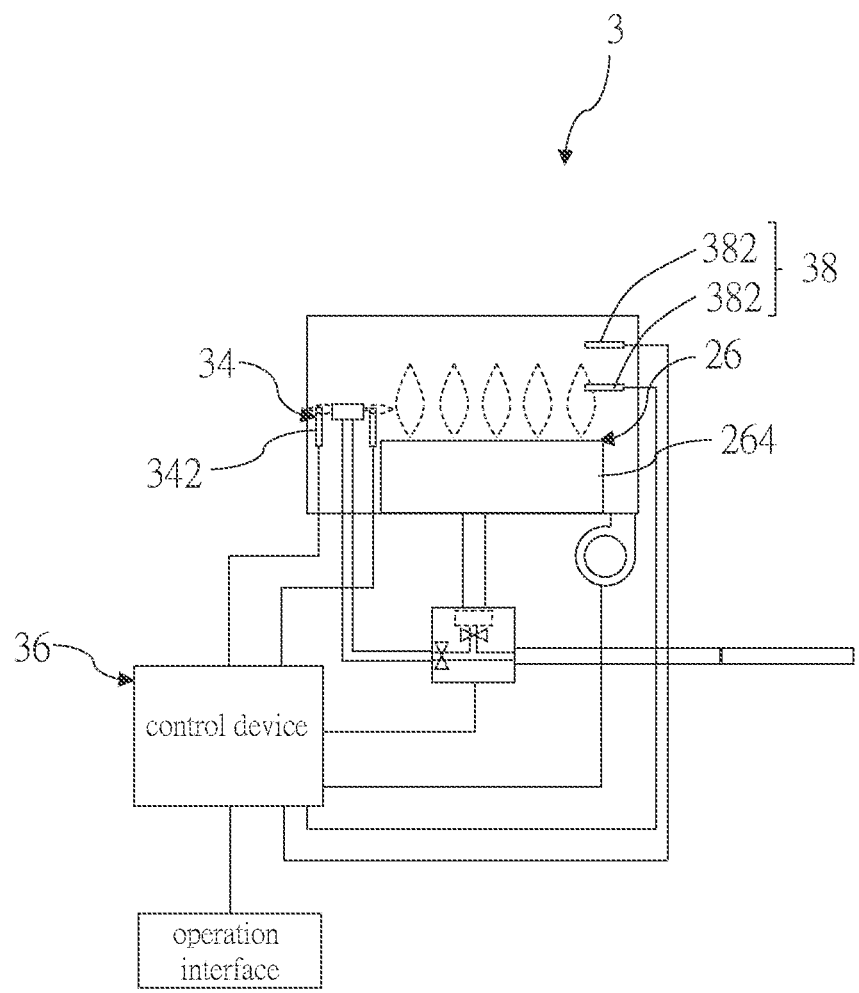
FIG. 4 is a schematic view of a gas appliance of a third embodiment according to the present invention.

A gas appliance 3 of a third preferred embodiment according to the present invention is shown in FIG. 4, wherein the gas appliance 3 includes a structure which is similar to the gas appliance 2 of the second embodiment, except that the detection device 34 includes a flame height detection module 38. The flame height detection module 38 is for detecting a height of the flames generated by the combustion device 26, and the detected height of the flames corresponds to the burning state of the flames of the combustion device 26. The flame sensing electrode 342 is for detecting whether the flames of the pilot fire is present or not.

In the current embodiment, the flame height detection module 38 includes two flame sensing electrodes 382 electrically connecting the control device 36. The two flame sensing electrodes 382 are disposed above the main fire burner 264 at different heights respectively to detect the height of the flames generated by the main fire burner 264.

The height of the flames when the flames is in contact with the flame sensing electrode 382 at a higher position is defined as a predetermined height.

In the detection mode, when the height of the flames detected by the flame height detection module 38 is greater than the predetermined height, the control device 36 determines that the first state is matched, which represents that the natural gas is the first natural gas. When the height of the flames detected by the flame height detection module 38 is less than the predetermined height, which means the flames is only in contact with the flame sensing electrode 382 at a lower position, the control device 36 determines that the second state is matched, which represents that the natural gas is the second natural gas.

In this way, the control device 36 can be switched to be operated in the first operation mode or the second operation mode in correspondence to the flames state detected by the detection mode.

Figure 5:
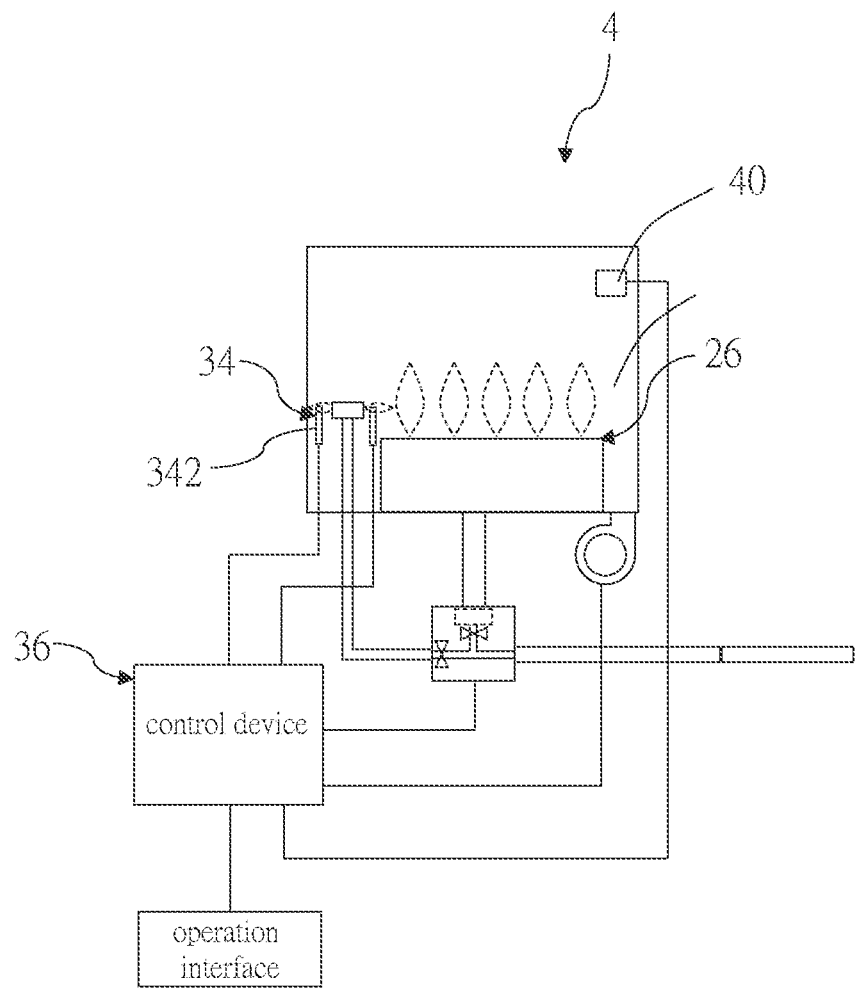
FIG. 5 is a schematic view of a gas appliance of a fourth embodiment according to the present invention.

The gas appliance 4 of a fourth preferred embodiment according to the present invention is shown in FIG. 5, wherein the gas appliance 4 includes a structure which is similar to the gas appliance 2 of the second embodiment, except that the detection device 34 includes an infrared detector 40 for detecting intensity of infrared ray generated by the combustion device 26, and the detected intensity of the infrared ray corresponds to the burning state of the flames of the combustion device 26. The flame sensing electrode 342 is for detecting whether the flames of the pilot fire is present or not.

When the detected intensity of the infrared ray is greater than a predetermined intensity, the control device 36 determines that the first state is matched, which represents that the natural gas is the first natural gas. When the detected intensity of the infrared ray is less than the predetermined intensity, the control device 36 determines that the second state is matched, which represents that the natural gas is the second natural gas.

In this way, the control device 36 can be switched to be operated in the first operation mode or the second operation mode in correspondence to the flame state detected by the detection mode.

Figure 6:
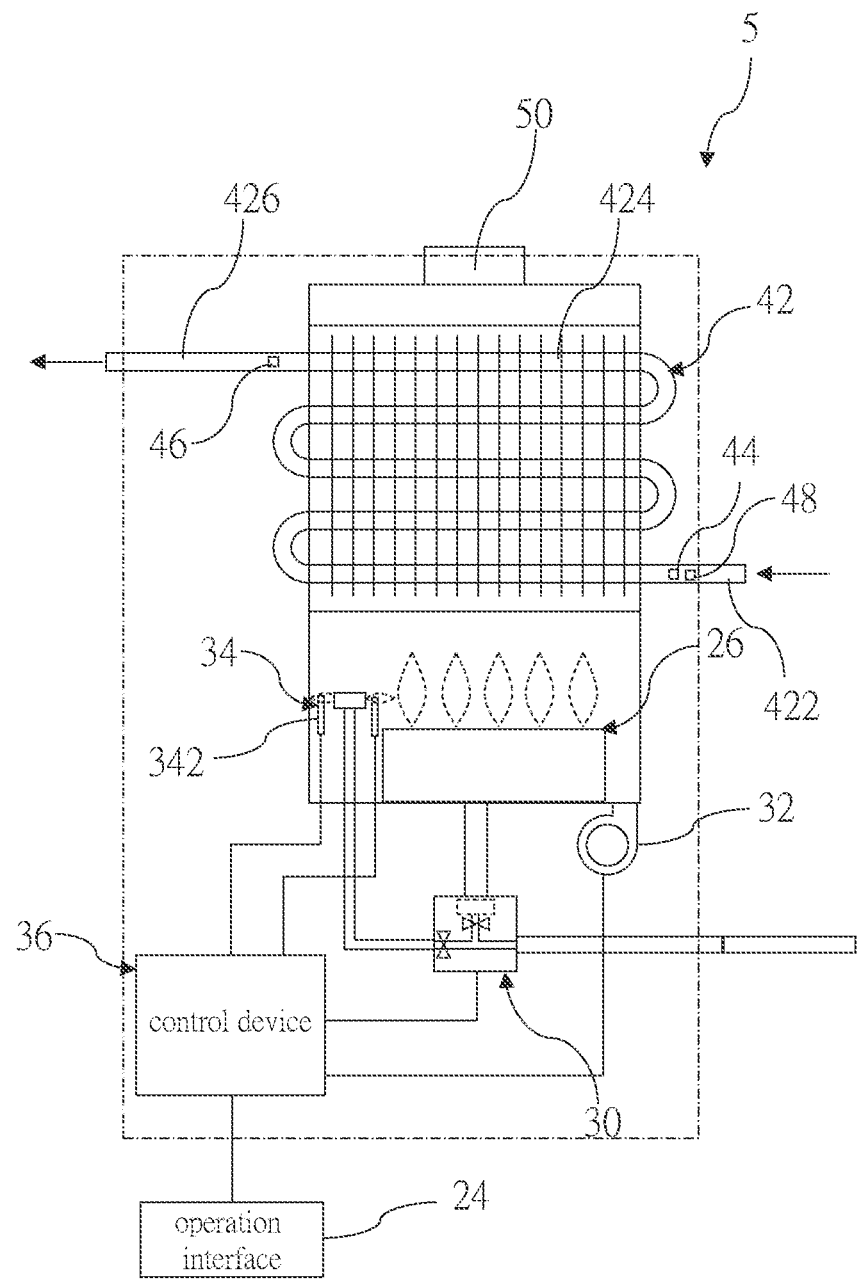
FIG. 6 is a schematic view of a gas appliance of a fifth embodiment according to the present invention.

The gas appliance 5 of a fifth preferred embodiment according to the present invention is shown in FIG. 6, which is an example of a water heater. The gas appliance 5 includes a structure which is similar to the gas appliance 2 of the second embodiment, except that the gas appliance 5 comprises a water pipe 42 including an inlet pipe section 422, a heating pipe section 424, and an outlet pipe section 426 connected in sequence. The heating pipe section 424 is disposed above the combustion device 26. The flames generated by the combustion device 26 heats the heating pipe section 424. The detection device 34 includes an inlet water temperature detector 44, an outlet temperature detector 46, and a water flow detector 48 electrically connecting to the control device 36. The inlet water temperature detector 44 and the water flow detector 48 are disposed at the inlet pipe section 422 while the outlet temperature detector 46 is disposed at the outlet pipe section 426. The inlet water temperature detector 44, the outlet temperature detector 46, and the water flow detector 48 respectively detect an inlet water temperature, an out water temperature, and a water flow.

An exhaust passage 50 disposed above the water pipe 42 communicates with the combustion device 26. The gas generated by the combustion device 26 burning the natural gas exhausts through the exhaust passage 50.

In the current embodiment, the control device 36 is operated in the detection mode when the operation interface 24 outputs the detection signal and the water flow detector 48 detects the water flowing. In the detection mode, the control device 36 determines whether the burning state is the first state or the second state in correspondence to the impedance of the flames detected by the flame sensing electrode 342. When the detected impedance of the flames is less than a predetermined impedance, the control device 36 determines that the first state is matched, which represents that the natural gas is the first natural gas. When the detected impedance of the flames is greater than the predetermined impedance, the control device 36 determines that the second state is matched, which represents that the natural gas is the second natural gas.

In this way, the control device 36 can be switched to be operated in the first operation mode or the second operation mode in correspondence to the flame state detected by the detection mode.

When operated in the first operation mode or the second operation mode, the control device 36 controls the gas valve 30 and the blower 32 in correspondence to the inlet water temperature, the outlet water temperature, the water flow, and a set temperature.

Figure 7:
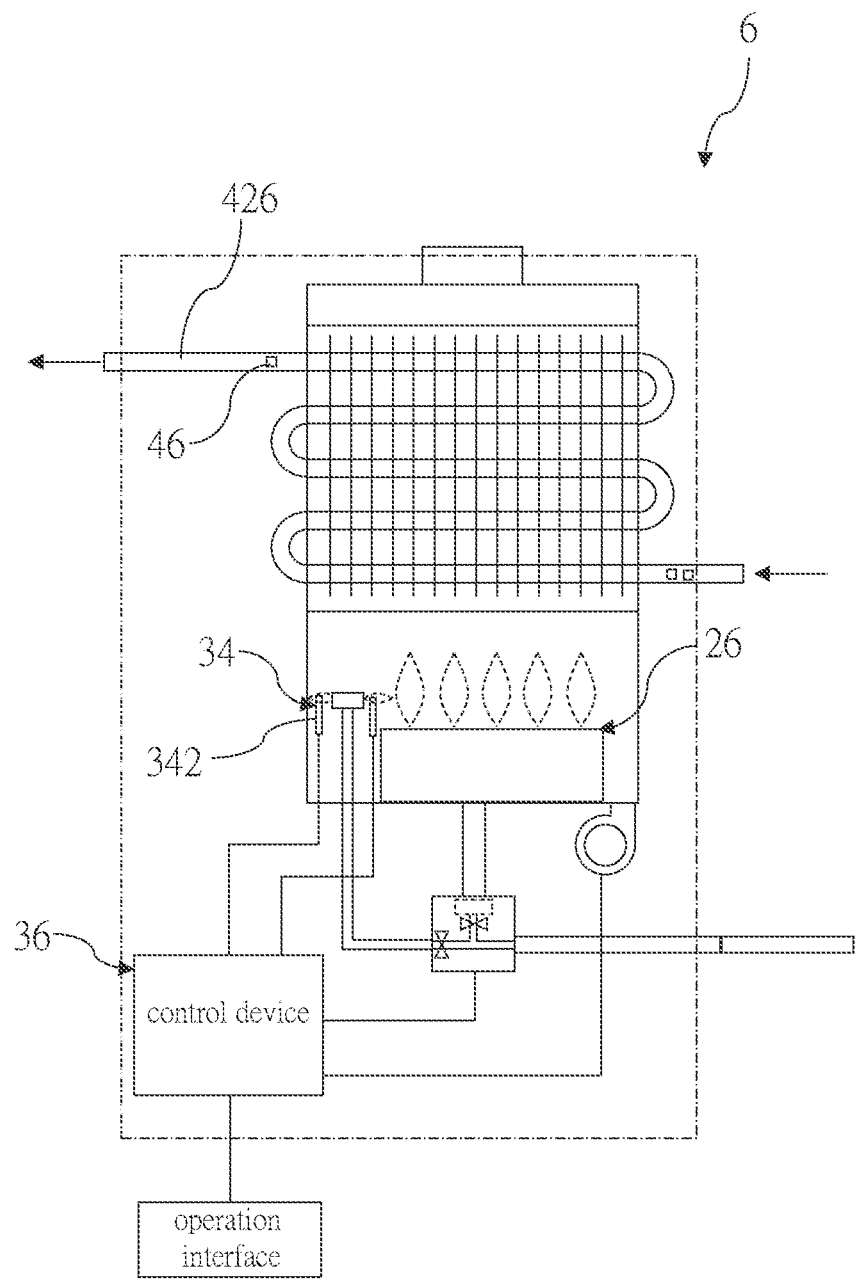
FIG. 7 is a schematic view of a gas appliance of a sixth embodiment according to the present invention.

The gas appliance 6 of a sixth preferred embodiment according to the present invention is shown in FIG. 7, wherein the gas appliance 6 includes a structure which is similar to the gas appliance 5 of the fifth embodiment, except that the flame sensing electrode 342 is for detecting whether the flames of the pilot fire is present or not. The outlet water temperature detector 46 of the detecting device 34 detects an outlet water temperature of the outlet pipe section 426, in which the outlet water temperature corresponds to the burning state of the flames of the combustion device 26. In the detection mode, since there is a fixed gas flow and a fixed air flow, the combustion efficiency is good when the outlet water temperature is greater than a predetermined temperature, and the control device 36 determines that the first state is matched, which represents that the natural gas is the first natural gas. The combustion efficiency is poor when the outlet water temperature is less than the predetermined temperature, and the control device 36 determines that the second state is matched, which represents that the natural gas is the second natural gas.

Alternatively, rather than determining the burning states of the flames by the outlet water temperature, in a detection mode, the control device 36 calculates the combustion efficiency in correspondence to the inlet water temperature, the outlet water temperature, and the water flow. When the combustion efficiency is greater than a predetermined efficiency, it is determined that the first state is matched, and when the combustion efficiency is less than a predetermined efficiency, it is determined that the second state is matched.

Figure 8:
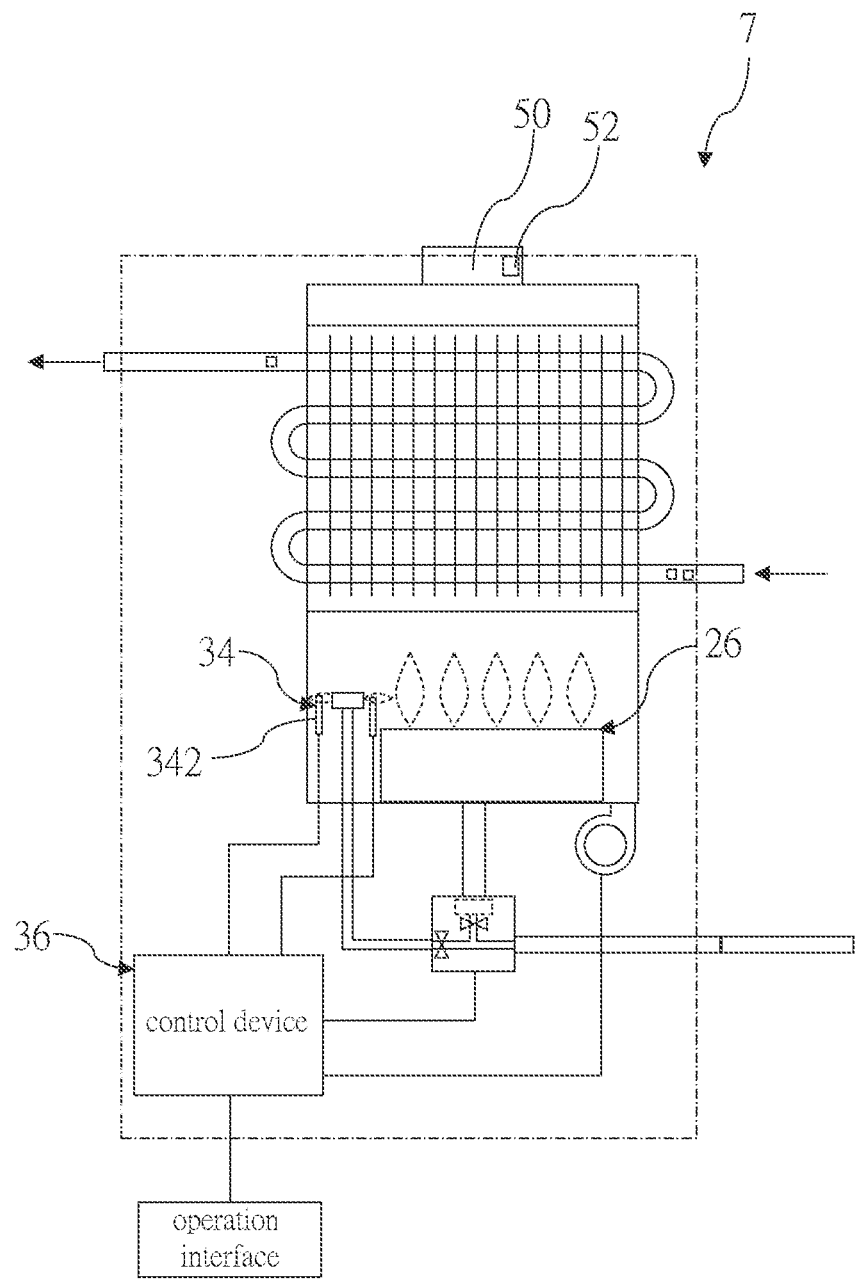
FIG. 8 is a schematic view of a gas appliance of a seventh embodiment according to the present invention.

The gas appliance 7 of a seventh preferred embodiment according to the present invention is shown in FIG. 8, wherein the gas appliance 7 includes a structure which is similar to the gas appliance 5 of the fifth embodiment, except that the flame sensing electrode 342 is for detecting whether the flames of the pilot fire is present or not. The detecting device 34 includes a gas detector 52, in which the gas detected by the gas detector 52 is carbon monoxide, but it is not limited thereto, it can detect carbon dioxide. The gas detector 52 is disposed in the exhaust passage 50 and detects a concentration of passing gas, in which the concentration of the detected passing gas corresponds to the burning state of the flames of the combustion device 26.

In the detection mode, when the concentration of the detected passing gas is less than a predetermined concentration, the combustion efficiency is good and the control device 36 determines that the first state is matched, which represents that the natural gas is the first natural gas. When the concentration of the detected passing gas is less than the predetermined concentration, the combustion efficiency is poor and the control device 36 determines that the second state is matched, which represents that the natural gas is the second natural gas.

As mentioned above, the gas appliance of the present invention can determine that the natural gas supplied by the gas supply pipe P is the first natural gas or the second natural gas in correspondence to the flame states, and the gas appliance can be configured to the corresponding first operation mode or the second operation mode to be suitable for burning the first natural gas or second natural gas with various heating values.

It must be pointed out that the embodiments described above are only some embodiments of the present invention. All equivalent structures which employ the concepts disclosed in this specification and the appended claims should fall within the scope of the present invention.

What is claimed is:

1. A gas appliance for connecting a gas supply pipe, wherein the gas supply pipe is for injecting natural gas, the natural gas is one of a first natural gas and a second natural gas, and a heating value of the first natural gas and that of the second natural gas are different, comprising:

a combustion device for burning the natural gas to generate flames;

an ignitor disposed beside the combustion device to ignite the natural gas output by the combustion device;

a gas valve communicating with the gas supply pipe and the combustion device, and controlled to change a gas flow supplied to the combustion device;

a blower controlled to change an air flow supplied to the combustion device;

a detecting device for detecting a burning state of the flames of the combustion device;

a control device electrically connecting the gas valve, the blower, and the detecting device, wherein the control device is operated in a detection mode in which the control device controls the ignitor to ignite and controls the gas valve as well as the blower to provide a fixed gas flow and a fixed air flow to the combustion device; after igniting the flames, the control device determines whether the burning state detected by the detecting device matches a first state or a second state; if matching the first state, the control device is operated in a first operation mode and controls the gas valve and the blower in correspondence to a first control data of the first natural gas so the combustion device is suitable for burning the first natural gas; if matching the second state, the control device is operated in a second operation mode and controls the gas valve and the blower in correspondence to a second control data of the second natural gas so the combustion device is suitable for burning the second natural gas;

wherein when the control device determines that the burning state detected by the detecting device matches the first state, the first operation mode is further configured to be a preset operation mode; after the control device controls the gas valve to block gas and controls the blower to stop running, the control device receives a start signal and then is operated in the preset operation mode to control the ignitor to ignite and control the gas valve and the blower in correspondence to the first control data;

wherein when the control device determines that the burning state detected by the detecting device matches the second state, the second operation mode is further configured to be another preset operation mode; after the control device controls the gas valve to block gas and controls the blower to stop running, the control device receives the start signal and then is operated in the another preset operation mode to control the ignitor to ignite and control the gas valve and the blower in correspondence to the second control data.

2. The gas appliance of claim 1, wherein when the control device determines that the burning state detected by the detecting device does not match the first state and the second state, the control device controls the gas valve to block gas and controls the blower to stop running.

3. The gas appliance of claim 1, wherein after the control device is operated in the first operation mode, the control device controls the gas valve and the blower at predetermined intervals to provide a fixed gas flow and a fixed air flow to the combustion device, and the control device determines whether the burning state detected by the detecting device matches the first state or the second state; if matching the first state, the control device is operated in the first operation mode; if matching the second state, the control device is operated in the second operation mode.

4. The gas appliance of claim 1, wherein after the control device is operated in the second operation mode, the control device controls the gas valve and the blower at predetermined intervals to provide a fixed gas flow and a fixed air flow to the combustion device, and the control device determines whether the burning state detected by the detecting device matches the first state or the second state; if matching the second state, the control device is operated in the second operation mode; if matching the first state, the control device is operated in the first operation mode.

5. The gas appliance of claim 1, wherein when the control device receives a detection signal, the control device is operated in the detection mode.

6. The gas appliance of claim 1, comprising an exhaust passage communicating the combustion device, wherein the detecting device has a gas detector which is disposed in the exhaust passage and detects a concentration of passing gas, the concentration of the detected passing gas corresponds to the burning state of the flames of the combustion device; when the concentration of the detected passing gas is less than a predetermined concentration, the control device determines that the first state is matched; when the concentration of the detected passing gas is greater than the predetermined concentration, the control device determines that the second state is matched.

7. The gas appliance of claim 6, wherein the passing gas detected by the gas detector is carbon monoxide.

8. The gas appliance of claim 1, wherein the detecting device includes a flame sensing electrode for detecting an impedance of the flames which is generated by the combustion device and corresponds to the burning state of the flames of the combustion device; when the impedance of the detected flames is less than a predetermined impedance, the control device determines that the first state is matched; when the impedance of the detected flames is greater than the predetermined impedance, the control device determines that the second state is matched.

9. The gas appliance of claim 1, wherein the detecting device includes a thermocouple for detecting the flames generated by the combustion device and outputting a detection voltage which corresponds to the burning state of the flames of the combustion device; when the detection voltage is greater than a predetermined voltage, the control device determines that the first state is matched; when the detection voltage is less than the predetermined voltage, the control device determines that the second state is matched.

10. The gas appliance of claim 1, wherein the detecting device includes a flame height detection module for detecting a height of the flames generated by the combustion device, and the detected height of the flames corresponds to the burning state of the flames of the combustion device; when the height of the flames detected by the flame height detection module is greater than a predetermined height, the control device determines that the first state is matched; when the height of the flames detected by the flame height detection module is less than the predetermined height, the control device determines that the second state is matched.

11. The gas appliance of claim 1, comprising a water pipe including an inlet pipe section, a heating pipe section, and an outlet pipe section connected in sequence, wherein the flames generated by the combustion device heats the heating pipe section; the detecting device includes an outlet water temperature detector for detecting an outlet water temperature of the outlet pipe section, and the detected outlet water temperature corresponds to the burning state of the flames of the combustion device; when the outlet water temperature is higher than a predetermined temperature, the control device determines that the first state is matched;

when the outlet water temperature is lower than the predetermined temperature, the control device determines that the second state is matched.

12. The gas appliance of claim 1, comprising a water pipe including an inlet pipe section, a heating pipe section, and an outlet pipe section connected in sequence, wherein the flames generated by the combustion device heats the heating pipe section; the detecting device includes an inlet water temperature detector, an outlet water temperature detector, and a water flow detector which respectively detect an inlet water temperature, an outlet water temperature, and a water flow; the control device calculates combustion efficiency in correspondence to the inlet water temperature, the outlet water temperature, and the water flow; when the combustion efficiency is greater than a predetermined efficiency, the control device determines that the first state is matched; when the combustion efficiency is less than the predetermined efficiency, the control device determines that the second state is matched.

13. The gas appliance of claim 1, wherein the detecting device includes an infrared detector for detecting intensity of infrared ray generated by the combustion device, and the detected intensity of the infrared ray corresponds to the burning state of the flames of the combustion device; when the detected intensity of the infrared ray is greater than a predetermined intensity, the control device determines that the first state is matched; when the detected intensity of the infrared ray is less than the predetermined intensity, the control device determines that the second state is matched.

14. A control method of a gas appliance, wherein the gas appliance is for connecting a gas supply pipe which is for injecting natural gas, the natural gas is one of a first natural gas and a second natural gas, and a heating value of the first natural gas and that of the second natural gas are different; the gas appliance includes a combustion device for burning the natural gas to generate flames, an ignitor, a gas valve, a blower, a detecting device, and a control device; the ignitor is disposed beside the combustion device to ignite the natural gas output by the combustion device; the gas valve communicates with the gas supply pipe and the combustion device, and is controlled to change a gas flow supplied to the combustion device; the blower is controlled to change an air flow supplied to the combustion device; the detecting device is for detecting a burning state of the flames of the combustion device; the control device electrically connects the gas valve, the blower, and the detecting device; the control method, executed by the control device, comprising the following steps:

the control device is operated in a detection mode in which the control device controls the ignitor to ignite and controls the gas valve as well as the blower to provide a fixed gas flow and a fixed air flow to the combustion device;

after igniting the flames, the control device determines whether the burning state detected by the detecting device matches a first state or a second state;

if matching the first state, the control device is operated in a first operation mode and controls the gas valve and the blower in correspondence to a first control data of the first natural gas so the combustion device is suitable for burning the first natural gas;

if matching the second state, the control device is operated in a second operation mode and controls the gas valve and the blower in correspondence to a second control data of the second natural gas so the combustion device is suitable for burning the second natural gas;

wherein when the control device determines that the burning state detected by the detecting device matches the first state, the first operation mode is further configured to be a preset operation mode; after the control device controls the gas valve to block gas and controls the blower to stop running, the control device receives a start signal and then is operated in the preset operation mode to control the ignitor to ignite and control the gas valve and the blower in correspondence to the first control data;

wherein when the control device determines that the burning state detected by the detecting device matches the second state, the second operation mode is further configured to be a preset operation mode; after the control device controls the gas valve to block gas and controls the blower to stop running, the control device receives a start signal and then is operated in the preset operation mode to control the ignitor to ignite and control the gas valve and the blower in correspondence to the second control data.

15. The control method of a gas appliance of claim 14, further comprising the following steps:

after the control device is operated in the first operation mode, the control device controls the gas valve and the blower at predetermined intervals to provide a fixed gas flow and a fixed air flow to the combustion device, and the control device determines whether the burning state detected by the detecting device matches the first state or the second state; if matching the first state, the control device is operated in the first operation mode; if matching the second state, the control device is operated in the second operation mode.

16. The control method of a gas appliance of claim 14, further comprising the following steps:

after the control device is operated in the second operation mode, the control device controls the gas valve and the blower at predetermined intervals to provide a fixed gas flow and a fixed air flow to the combustion device, and the control device determines whether the burning state detected by the detecting device matches the first state or the second state; if matching the second state, the control device is operated in the second operation mode; if matching the first state, the control device is operated in the first operation mode.

* * * * *